9 Sheets--Sheet 5

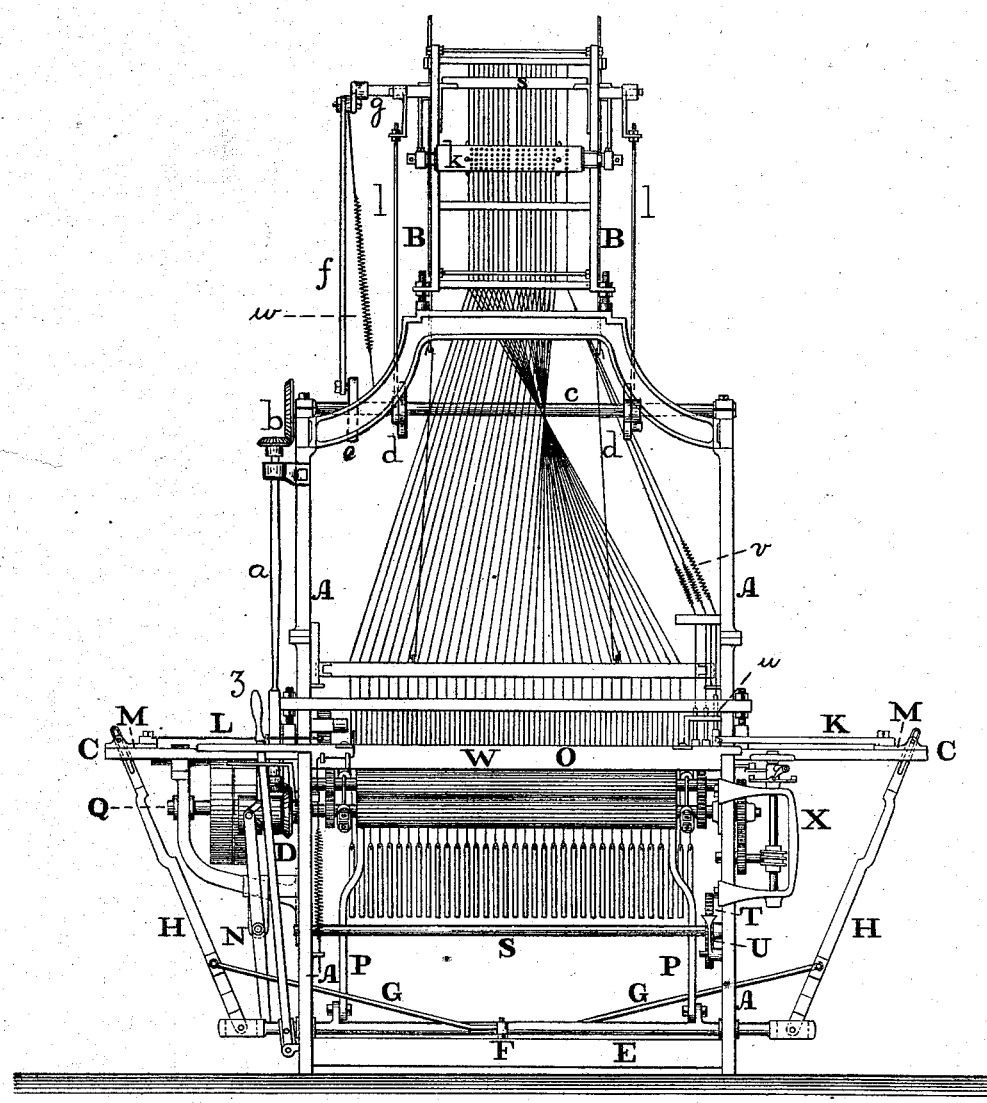

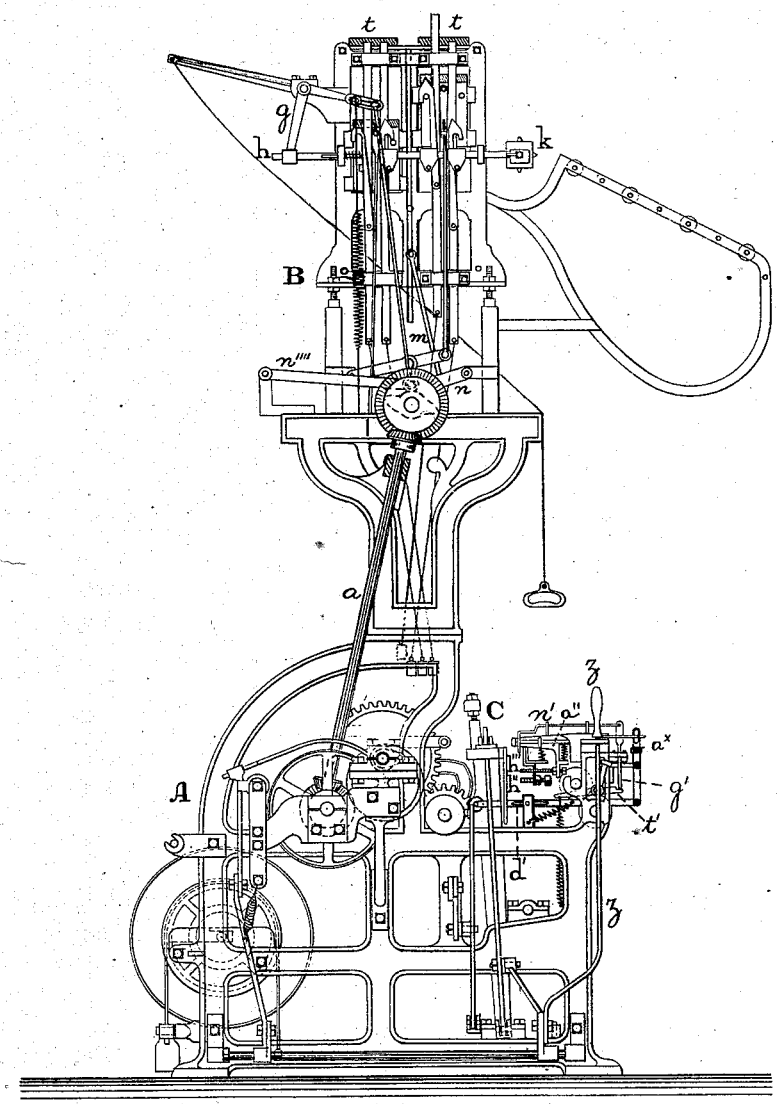

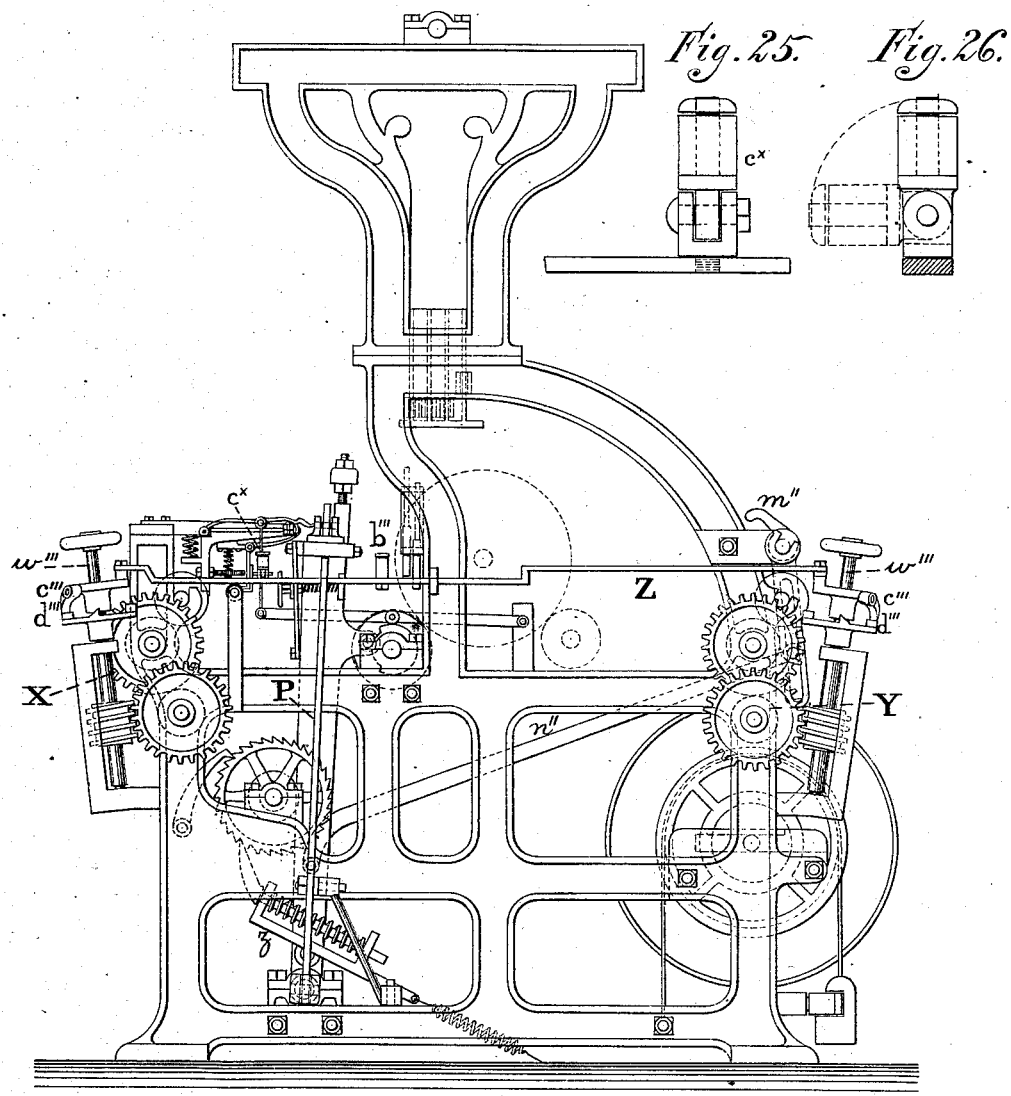

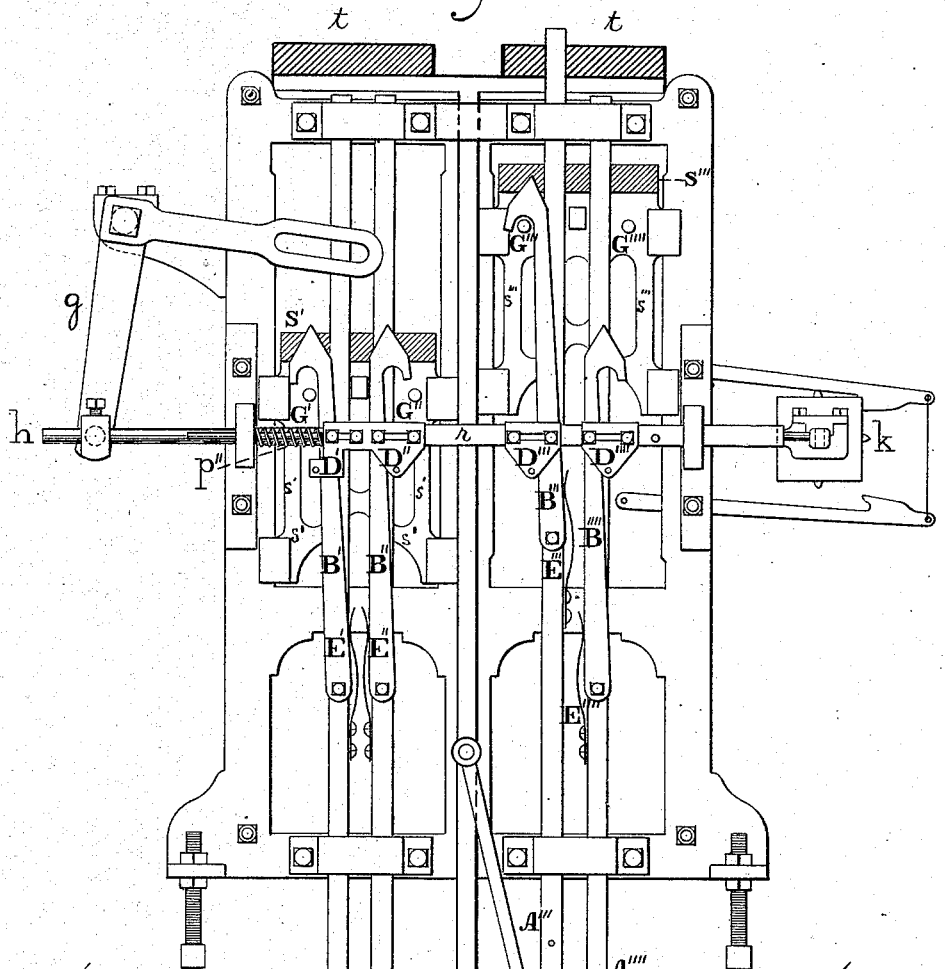
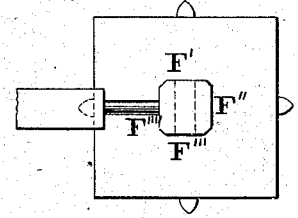
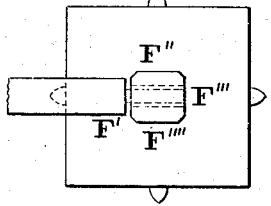
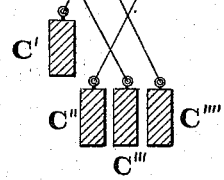

J. DORNAN.
Loom.

No. 159,653. Patented Feb. 9, 1875.

Witnesses:
L. F. Bross
A. P. Grant.

Inventor:
John Dornan,
by John A. Wiedersheim
Att'y

J. DORNAN.
Loom.
No. 159,653
9 Sheets--Sheet 6
Patented Feb. 9, 1875.
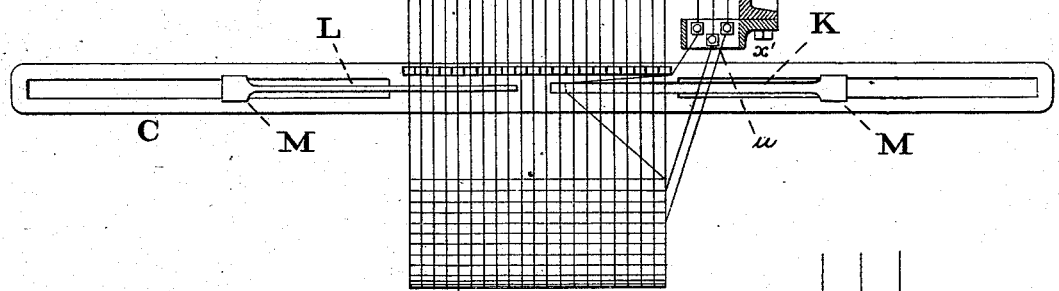
Fig. 12.
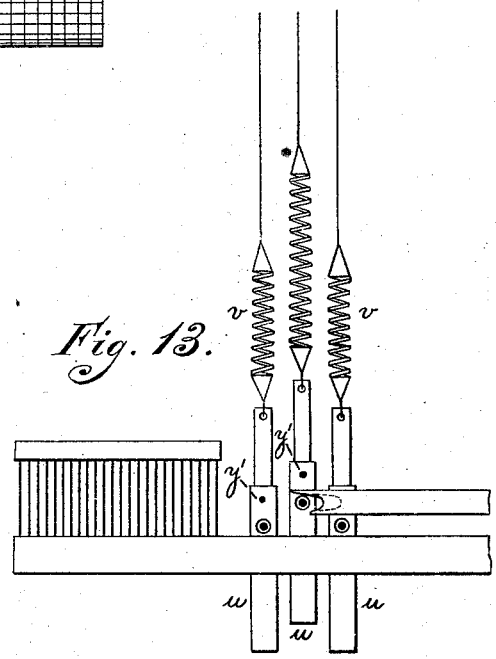
Fig. 13.
Fig. 14.
Witnesses:
L. F. Brow
A. P. Grant.
Inventor:
John Dornan,
by
John A. Wiedersheim,
Atty.

J. DORNAN.
Loom.

No. 159,653.

Patented Feb. 9, 1875.

9 Sheets--Sheet 7

Witnesses:
L. F. Brous
A. P. Grant.

Inventor:
John Dornan,
by
John A. Wiedersheim
atty.

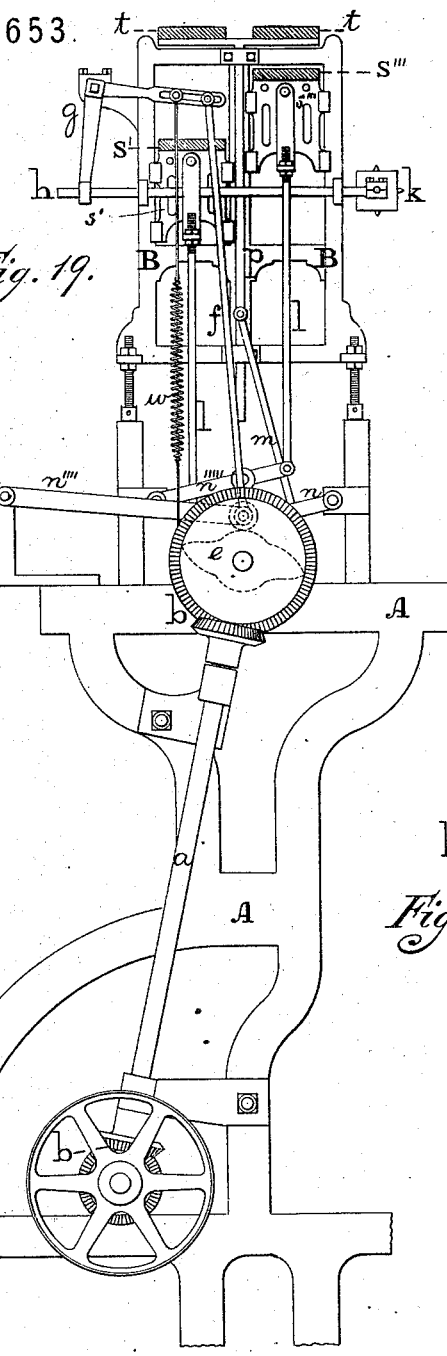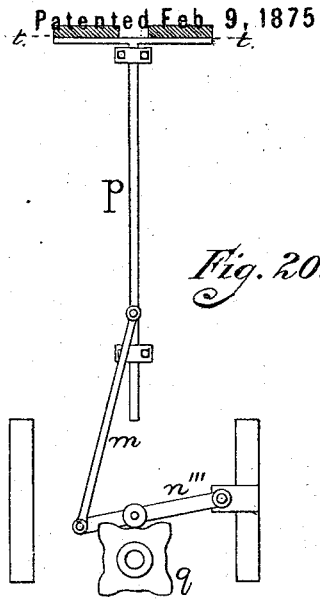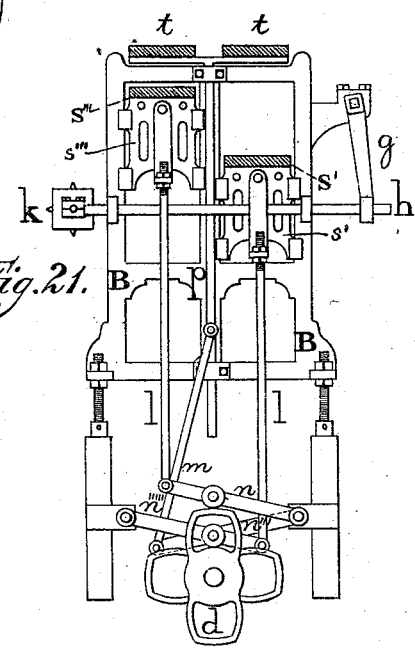

UNITED STATES PATENT OFFICE.

JOHN DORNAN, OF PHILADELPHIA, PENNSYLVANIA.

IMPROVEMENT IN LOOMS.

Specification forming part of Letters Patent No. 159,653, dated February 9, 1875; application filed January 27, 1875.

*To all whom it may concern:*

Be it known that I, JOHN DORNAN, of the city and county of Philadelphia and State of Pennsylvania, have invented a new and useful Improvement in Looms; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 9:
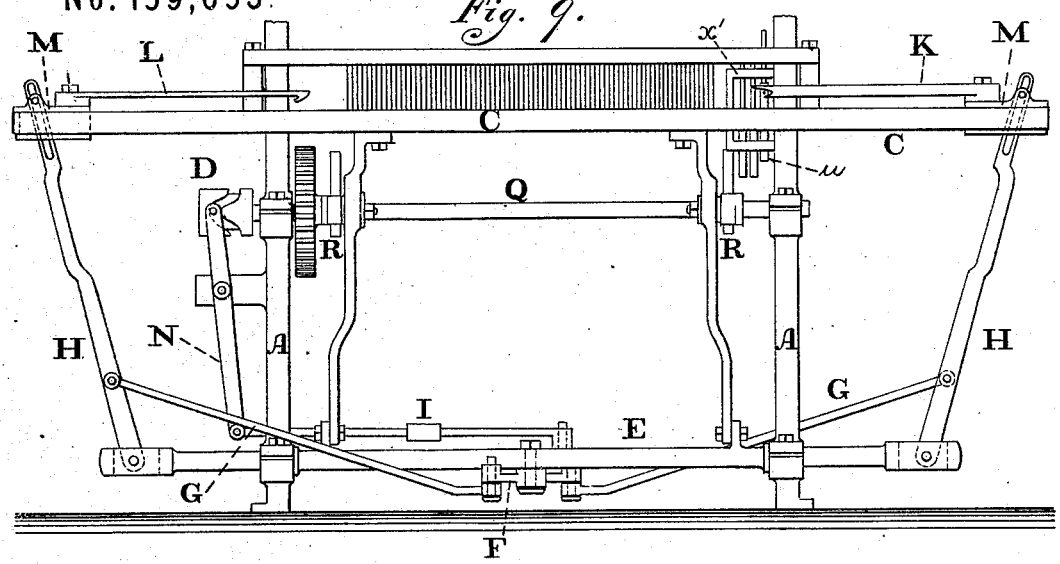
Figure 10:
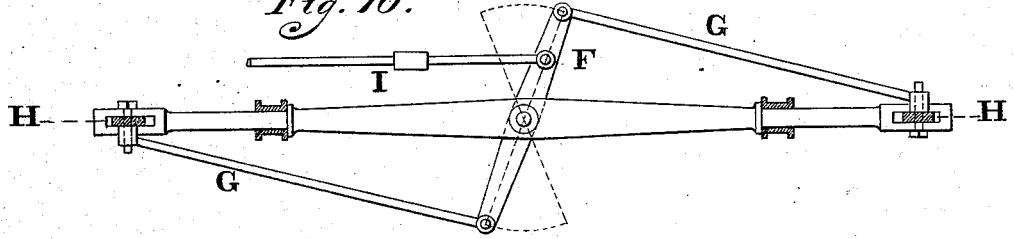
Figure 11:
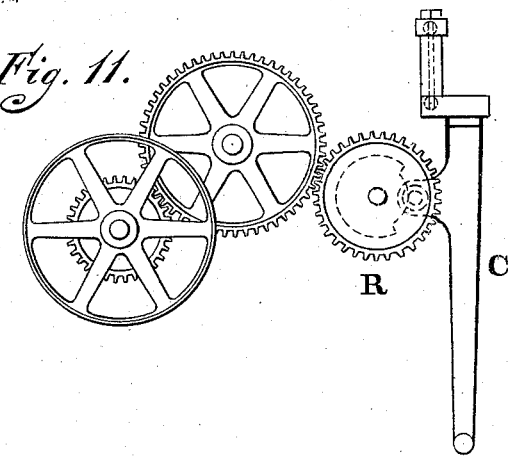
Figure 15:
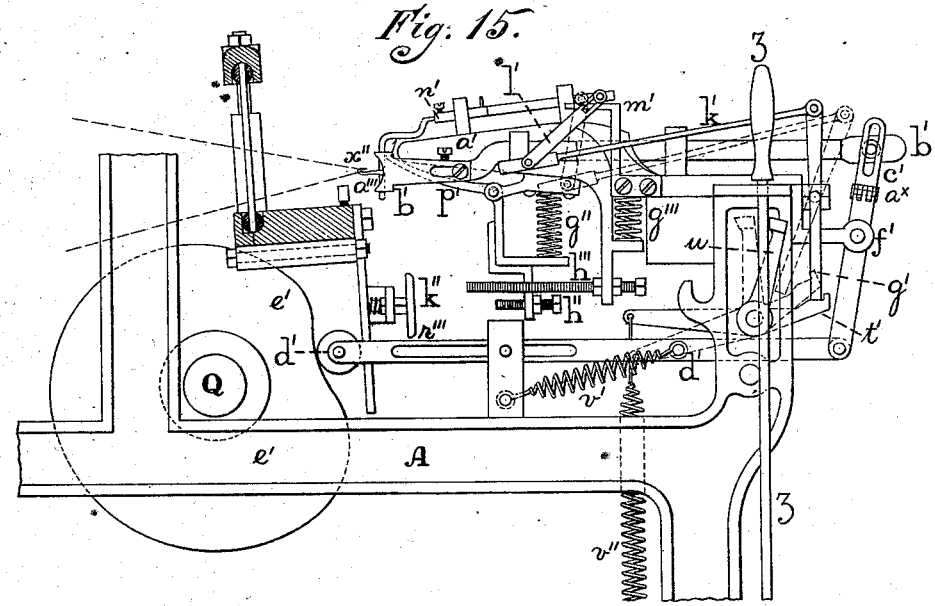
Figures 17, 18:
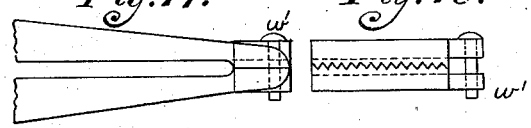
Figure 16:
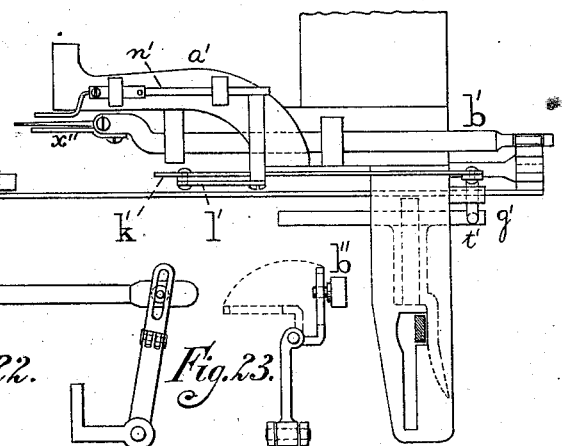
Figures 22, 23:
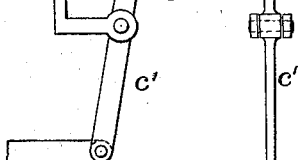
Figure 24:
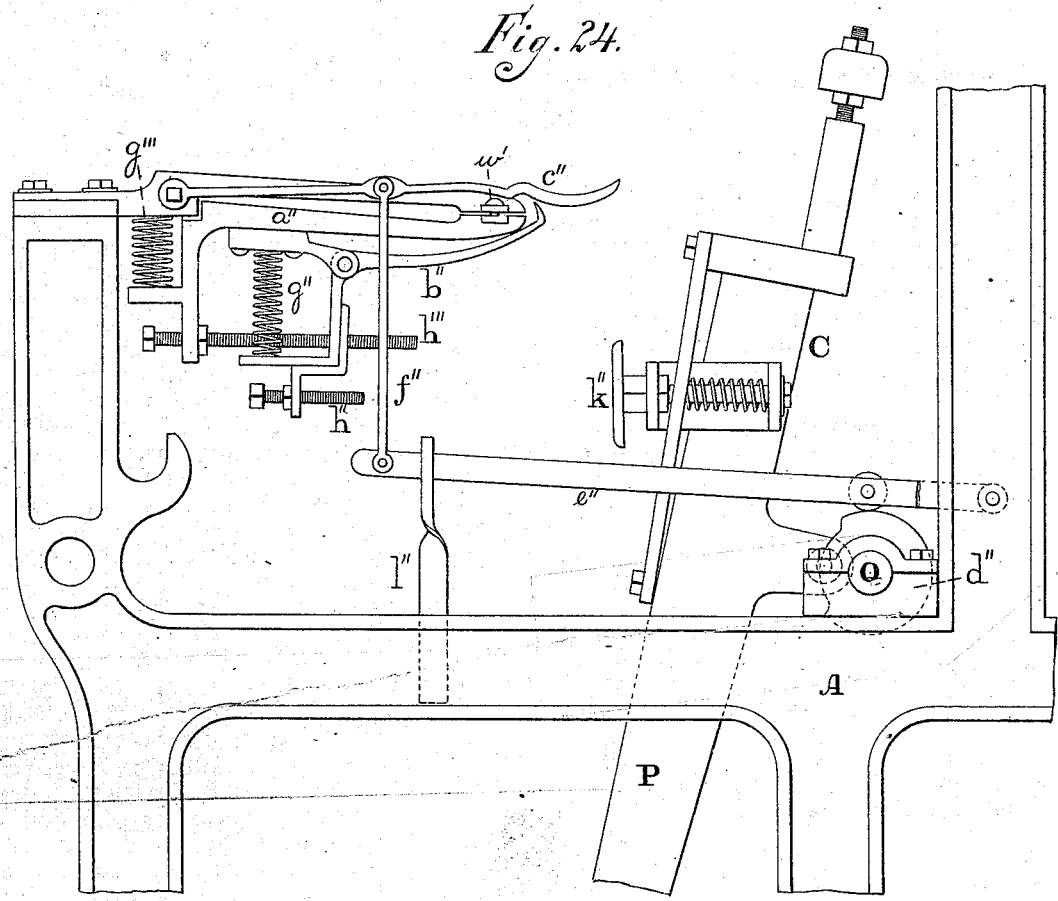
Figure 27:
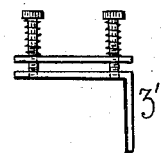

Figure 1 is a front view of the loom embodying my invention. Fig. 2 is a side view thereof. Fig. 3 is a side view enlarged of the take-up and let-off motions. Fig. 4 is a side view of the jacquard. Figs. 5 and 6 are detached views of the jacquard cylinder and journal-needle. Fig. 9 is a front view of the batten, picking-motion, and accessories. Fig. 10 is a top view of the rock-shaft of the lathe and the picking motion. Fig. 11 is a side view of the batten and driving-wheels. Fig. 12 is a plan or top view of the batten, showing the chain and filling, and illustrating the manner of forming the web. Fig. 13 is a front view of the mail or filling guides, and a portion of the batten and reed. Fig. 14 is a detached view of the carrier and receiving-hook. Fig. 15 is a side view of the jaw-temple, finger-temple, selvage motion, and stop motion. Fig. 16 is a plan of the jaw-temple, selvage motion, and stop motion. Figs. 17 and 18 are side views of the nipping part of the temple. Fig. 19 is a side elevation of the driving end of the loom, illustrating the mode of working the jacquard. Fig. 20 is a side view of the parts that work the top board of the jacquard. Fig. 21 is a side view of the parts that work the lifting-boards of the jacquard. Fig. 22 is a side view of the needle-bar and shover-off. Fig. 23 is a front view of the hinged lever that works the needle-bar. Fig. 24 is a side view of the jaw-temple, finger-temple, filling-protector, and buffer. Figs. 25 and 26 are detached views of the hinged rod that connects the take-up and let-off. Fig. 27 is a front view of the filling-friction.

Similar letters of reference indicate corresponding parts in the several figures.

My invention consists, first, in mechanism for carrying the weft or filling into the shed by a carrier, which is met at the center of the warp-shed by a hook which receives the filling, and takes it to the opposite side, where it is to be knit into a selvage. It also consists in means for knitting the selvage by a needle-bar, to which is attached a latch-needle and a semicircular device for shoving the filling off the receiving-hook onto the latch-needle. It also consists in means for preventing the guide or needle bar from working. It further consists in a novel stop or protection motion. It also consists in a hinged jaw-temple in combination with a forked or finger temple. It also consists of a novel filling-protector. It further consists in mails or filling guides with springs intermediate of the jacquard and mails to prevent breakage of the parts. It also consists in the mail or filling guides, in combination with a friction device. It also consists in the let-off and take-up connected by a rod, which is adapted to be disconnected from the operating-lathe. It further consists in mechanism for lowering the top board and meeting of the trap or lifting boards. It further consists in the construction of the jacquard, journal-hooks, and journal-needles.

Referring to the drawings, A represents the frame of the loom, and B the frame of the jacquard. C represents the batten. On reference to Figs. 1 and 9, Q represents a driving-shaft, which is suitably mounted on the frame A, and to which is secured a grooved cam, D, which operates one end of a lever, N, pivoted to the frame A. The other end of said lever N is jointed to a rod, I, which is swiveled to an oscillating lever, F. Rods G are jointed to the said lever F and to the picking-sticks H, which are pivoted to the ends of a rock-shaft, E, whose bearings are on the frame A, the oscillating lever F having its axis on said rock-shaft E. The top of the batten or lathe C is slotted or grooved, and receives boxes M, in which work the upper ends of the picking-sticks. To one box is fastened a carrier, K, and to the other box is fastened a receiving-hook, L. When the shaft Q rotates motion is imparted to the lever N, rod I, and oscillating lever F, whereby reciprocating motion is imparted to the picking-sticks H, and consequently to the boxes M, carrier K, and receiving-hook L, and thus the filling is carried across, as desired. The oscillating motion of the batten is accomplished by the action of cams R, which are secured to the shaft Q, and connected to the frame of the batten.

Referring to Figs. 1, 15, 16, 22, the parts for knitting a selvage are as follows: Q represents the breast-beam, which supports the jaw-temple $a'$, on the side of which is arranged a guide or needle bar, $b'$, to which is fastened a latch-needle, $x''$. $c'$ represents a lever, which is mounted on an arm, $f'$, and by means of a slot and pin is connected to the needle-bar $b'$, and consists of two parts jointed to each other. A sliding bar, $d'$, is connected to the jointed lever $c'$, and held by a spring, $v'$, against the face of a cam, $e'$, which is secured to the driving-shaft Q, and imparts the necessary sliding motion to the bar $b'$, and consequently to the jointed lever $c'$, which carries the latch-needle, as has been stated, and also a semicircular device, $a'''$, for removing the filling from the receiving-hook L onto the latch-needle, which, being brought back by the action of the cam $e'$, knits one shot through the other, always allowing the last shot carried over to remain on the needle and under the latch preparatory to the guide or needle-bar moving forward to receive the next shot to be knitted. The joint or hinge $a^\times$ in the lever $c'$ permits the ready detachment of the guide or needle bar $b'$ from said lever $c'$ by throwing down the hinged portion, and prevents the guide or needle bar from working, thus giving liberty to said bar, and enabling the necessary repairs to be made to the cloth, in the event of the breakage of the filling, wrong shots, &c.

The stop or protector motion is as follows: Referring to Figs. 15 and 16, $n'$ represents a movable bar and finger, which works in guides on the top of the jaw-temple $a'$, or guides secured to the breast-beam O. To the bar $n'$ is attached, by a connecting-rod, $l'$, a rod, $k'$, which is jointed to a tumbler-lever, $g'$, adapted to rest on an escapement-lever, $t'$, when the loom is running. One thread of the filling always being on the needle when the loom is running properly, said filling keeps back the bar and finger $n'$, which causes the connecting-rod $k'$ attached to the tumbler-lever to rise above the batten or lathe. In case the filling breaks, or is not placed properly upon the latch-needle, it allows the bar and finger to run forward, which causes the rod $k'$, that is connected to the tumbler, to drop, and the batten or lathe coming forward and striking said rod causes the tumbler, which acts in conjunction with the lever $t'$ and the starting-bar $z$, to stop the loom instantly.

The loom-temple (see Figs. 2 and 24) has a hinged jaw, $a''$, beneath which is fastened the hinged finger or forked temple $b''$. To the lower part of the temple $b$ there is attached a longitudinally-extending screw, $h''$, and to the hinged jaw of the temple $a''$ is connected a screw, $h'''$. When the batten or lathe C comes up to the cloth it strikes the screw $h'''$, and thus opens the lower jaw of the temple $a''$. A spiral spring, $g'''$, closes the jaw on the recession of the lathe. To the sword P of the batten C there is secured a spring-buffer, $k''$, which, on the advance of the batten, strikes the screw $h''$ and lowers the finger-temple $b''$. A spring, $g''$, is employed to elevate the said finger-temple. The finger or forked temple $b''$ must be lowered, previous to the lowering of the lower jaw of the jaw-temple, to allow the filling to have clearance to be beat up by the lathe. The spring-buffer is so arranged as to operate the finger-temple in advance of the jaw-temple. To the top jaw of the hinged temple is a pin, $w'$, which works freely through the lower jaw, and is employed to prevent the filling drawing in a straight line with the filling or mail box guide. The temple $b''$ has numerous forks or fingers made thin, so as to allow them to pass easily through the openings in the reed, and is adapted to prevent the last shot woven from being taken backward on the back movement of the lay, and to keep the warp out to the proper width.

Referring to Fig. 24, the filling-protector consists of a finger, $c''$, which works along the side of the hinged jaw-temple $a''$, and to said finger is connected a lever, $f''$, to which is connected a lever, $e''$, which is hinged to a proper portion of the frame A, and carries a roller, which, bearing against a cam, $d''$, secured to the shaft Q, causes motion to the levers $e''$ and $f''$, and consequently to the finger $c''$. When the finger is raised it gives the carrier K the clearance necessary to enter the shed. Immediately on the beating up of the shot by the lathe the finger $c''$ drops, and holds the filling in position to be again carried across.

Referring to Figs. 1, 9, and 13, the mails or filling-guides are constructed as follows: $x'$ represents a box, which is secured to the side of the loom-frame, and in which work the mails or guides $u$, which are operated by the jacquard to give any number of filling-colors that may be desired. Between the jacquard and mails or guides are spiral or other springs $v$, which are employed to yield the difference between the half and full opening of the shed. Projecting from the face of the mails or guides are pins or shoulders $y'$, which serve to prevent the filling being raised higher than the center of the shed. The jacquard generally lifts from four to six inches, and the filling is put in at the half-opening of the shed, more or less; hence the springs yield and prevent breakage of parts immediately concerned. Back of the mail or guide box $x'$ is a friction device marked $z'$, (see Figs. 12 and 27,) which consists of a plate or bar guided, and confined by screws, and pressed by suitable springs, whereby the filling is prevented from being missed and from slackening, and the shot is tightened on the latch-needle when shoved off the receiving-hook L. On the side of the loom-frame A (see Fig. 3) there are mounted similar gearings X Y for taking up and letting off. One wheel of each of the gearing is a worm-wheel, and the said worm-wheels engage with the worms of shafts $u'''$, on the upper end of which are notched wheels $d'''$, which are operated by pawls $c'''$, the pawls being connected by a rod, Z, having a hinge or joint, $c^x$, which is in front of the batten or lathe, and a pin, $b'''$, with roller, being secured to the rod in the rear of the batten.

When the hinge or hinged pin $c^x$ of the rod is up, the batten, coming forward toward the cloth takes up the cloth, and lets off the warp, and the pin $b'''$ being struck by the receding batten or lathe, the rod Z is carried back, and the pawls are again placed in operative position. In the event of a misshot or breakage, or the reversal of the loom, the pin $c^x$ is lowered by hand, whereby the loom is allowed to run without operating the let-off and take-up. The tension of the warp is regulated by a lever, $n''$, which is connected to the sword P of the lathe C, and to the lever of a rock-shaft, $m''$, as is well known.

Referring to Figs. 2, 4, 5, 6, 19, 20, 21, the improvement in the jacquard consists in arranging the journal-bars in boxes or guides in the jacquard frames, to which bars are attached journal-hooks, which are operated by journal-needles, on whose back ends are spiral or other springs.

The journal-needles are operated by a square on the cylinder, which is perforated on two opposite sides, the other sides being blank, thus throwing the hooks on and off, as desired. The jacquard is constructed double, with trap or lifting boards, and knotted cords. Each trap-board lifts alternately or counterpoise. Secured to the knotted cords is the harness which passes through the journals, of which four are employed.

Referring to Figs. 19, 20, and 21, the cams $d$, $q$, and $e$ are driven by means in general use.

$n'''$ represents a treadle, which is operated by the cams $q$, and to said treadle is connected the rod $m$, which is jointed to the guided bar $p$, secured to the top board $t\ t$. $n''''$ represents a treadle, which is operated by a cam, $e$, and by means of a connecting-rod, $f$, is attached to the oscillating shaft $g$, which works the cylinder $k$. $n$ and $n'''''$ represent treadles, which are operated by the cam $d$, and by rods $l$ are connected to the trap or lifting board slides $s'\ s'''$, which have a counterpoise motion by said cams $d$.

The top board $t\ t$ is worked by the cams $g$, as has been stated, and begins to descend as the trap-boards $S'\ S'''$ ascend, thus giving a quicker opening of the shed. Sliding in boxes or guides fastened to the jacquard frames are the journal-bars $A'\ A''\ A'''\ A''''$, (see Fig. 4.) On the journal-bars work the journal-hooks $B'\ B''\ B'''\ B''''$. The journal-hooks are worked by journal-needles $r$, which are controlled by the cylinder K, and provided with pins $D'\ D''\ D'''\ D''''$. On the journal-bars are springs $E'\ E''\ E'''\ E''''$. The perforated portions of the square on the cylinder are indicated at $F'$ and $F'''$, Figs. 5 and 6, the blank portions at $F''$ and $F''''$. To the journal-bar $A'$ is attached, by means of a journal-wire, the journal $C'''$, to the journal-bar $A''$ the journal $C''''$, to the journal $A'''$, $C'$, to the journal bar $A''''$ the journal $C''$. Now the cylinder K being in, and the front lifting or trap board $S''''$ being about to be raised by the cams $d$, the blank $F''$, on the cylinder K, forces back the journal-needle $r$, thus allowing the pin $D''''$, which is fastened to the journal-needle $r$, to force the journal-hook $B''''$ off the pin $G''''$, and allowing the spring $E'''$, in journal-bar $A'''$, to force the journal-hook $B'''$ onto the pin $G'''$, in the slide $s'''$. The slide $s'''$, being raised by the cams $d$, raises the journal-bar $A'''$ and the journal $C'$. Then the trap or lifting board $S'''$ descending, the trap or lifting board $S'$ is beginning to ascend by the action of the cams $d$. The blank on the cylinder K still holds the journal-needle $r$ back, which allows the pin $D''$, fastened to the journal-needle, to force the journal hook $B''$ off the pin $G''$, which is fastened to the slide $s'$, and the board $S'$ ascending, raises the journal-bar $A'$ and the journal $C'''$. Now the trap or lifting-board $S'$ rising sufficiently high to catch the knots of the tails to be raised, the cam $e$ works the cylinder one-quarter turn, which allows a square with a hole to be next the needles. The trap or lifting board $S'''$ then ascending, and the journal-needle being already forced into the hole of the square by the spiral spring on the end of it, the pin $D'''$ forces the journal-hook $B'''$ off the pin $G'''$ in slide $s'''$, and the spring $E''''$ forces the journal-hook $B''''$ onto pin $G''''$ in slide $s'''$. The trap or lifting board $S'''$ then ascending, raises the journal-bar $A''''$ and the journal $C''$. The trap or lifting board $S'''$ having raised the full height, the trap or lifting board $S'$ is down, and the cylinder K being still in, allows the pin $D'$ on journal-needle $r$ to force the journal-hook $B'$ off pin $G'$ in slide $s'$, and allows the spring $E''$ on journal-bar $A''$ to force the journal-hook $B''$ onto the pin $G''$ and slide $s'$. The trap or lifting board $S'''$ descending, the trap or lifting board $S'$ ascends, which raises the journal-bar $B''$ and the journal $C''''$.

The cylinder now operates as before described, and controls the operation of the hooks and journals, as above stated.

Having thus described my invention, what I claim as new, and desire to secure by Letters Patent, is—

1. The lever N, the swivel-rod I, the oscillating lever F, the connecting-rods G, and the picking-sticks H, in combination with the carrier K and receiving-hook L, substantially for the purpose set forth.

2. The bar $b'$, with semicircular device $a'''$, and latch-needle $x''$, in combination with the lever $c'$ and sliding bar $d'$, substantially as and for the purpose set forth.

3. The combination, with the needle-bar $b'$ and sliding bar $d'$, of the lever $c'$, formed of parts jointed to each other, substantially as and for the purpose set forth.

4. The stop motion or protector, consisting of the movable bar or finger $n'$, in combination with the escapement-lever $t'$, and tumbler $g'$, and intermediate rods $k'\,l'$, substantially as and for the purpose set forth.

5. The hinged jaw-temple $a''$ and the finger or forked temple $b'''$, combined and operating substantially as and for the purpose set forth.

6. The filling-protector $c''$, working aside of hinged jaw-temple $a''$, the lever $f''$, the lever $e''$, combined and operating substantially as and for the purpose set forth.

7. The spring connection $v'$ between the mails and jacquard, substantially as and for the purpose set forth.

8. The mail or filling guides $u$, with pins $y'$, the box $x'$, and the friction device $z'$, combined and operating substantially for the purpose set forth.

9. The combination, with the lathe, of the rod Z, connecting the let-off and take-up, and having a hinged pin, $c^x$, and operating substantially as set forth.

10. The combination, with the top board, $t\,t$, and lifting-boards $S'\,S'''$, of the series of treadles $n\,n'''\,n'''''$, and connecting-rods $l\,l\,m$, and with the cams $d\,q$, substantially as and for the purpose set forth.

11. In combination with the pattern-cylinder, the journal-needle $r$ with the pins $D'\,D''\,D'''\,D''''$, substantially as and for the purpose set forth.

12. The sliding journal-bars $A'\,A''\,A'''\,A''''$, with hooks $B'\,B''\,B'''\,B''''$ jointed thereto, in combination with the springs $E'\,E''\,E'''\,E''''$, bearing against the hooks and attached to the bars, substantially as and for the purpose set forth.

13. The trap-board slides $s\,s'''$, with one or more pins, in combination with the journal-bars $A'\,A''\,A'''\,A''''$, hooks $B'\,B''\,B'''\,B'''$, and springs $E'\,E''\,E'''\,E''''$, substantially as and for the purpose set forth.

JOHN DORNAN.

Witnesses:
JOHN A. WIEDERSHEIM,
A. P. GRANT.